Jan. 6, 1953  E. D. WILKERSON  2,624,123
WHEEL ALIGNMENT SIGNALING MEANS
Filed Jan. 16, 1950
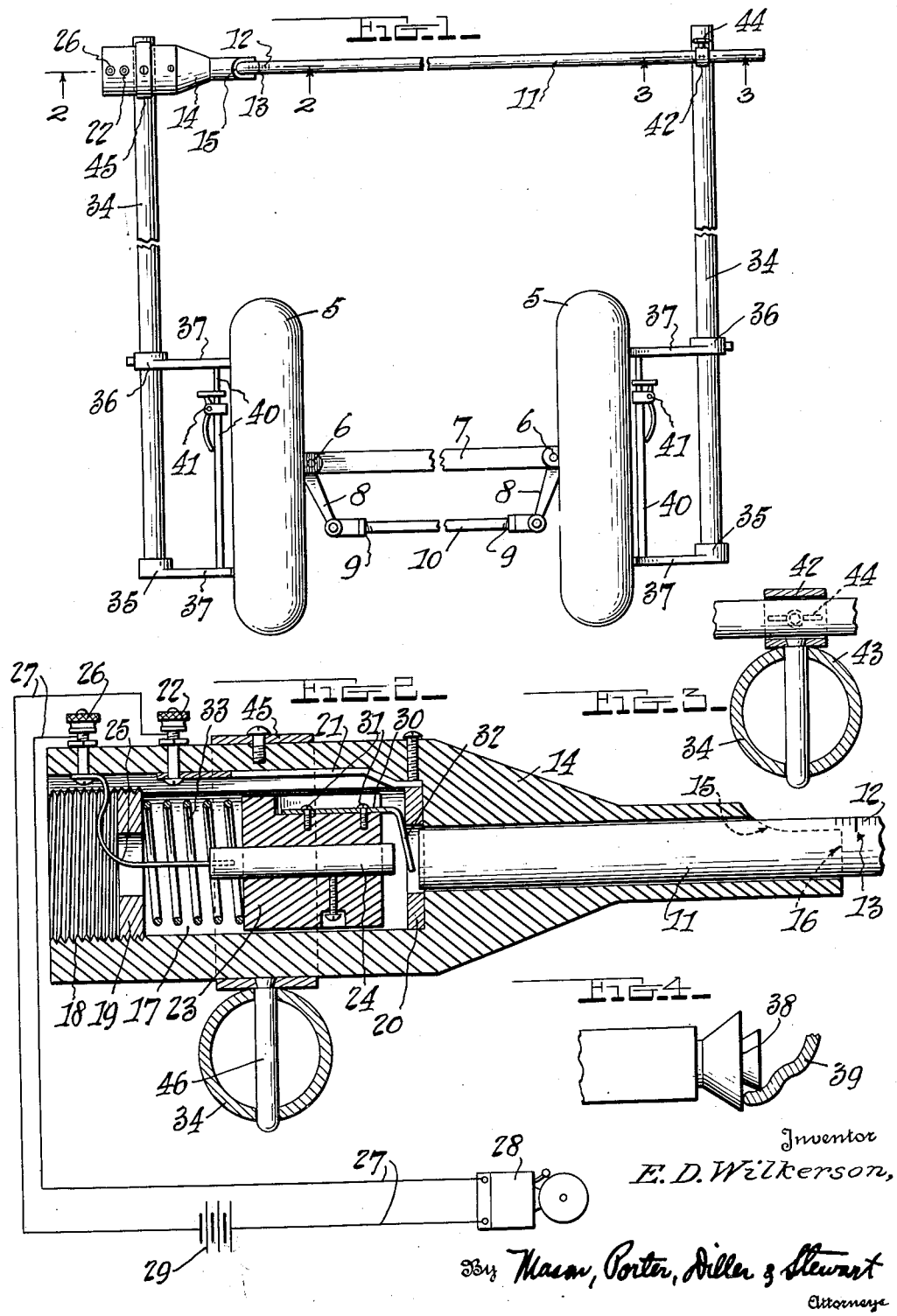
Inventor
E. D. Wilkerson,
By Mason, Porter, Diller & Stewart
Attorneys Patented Jan. 6, 1953

2,624,123

UNITED STATES PATENT OFFICE 2,624,123

WHEEL ALIGNMENT SIGNALING MEANS

Edward D. Wilkerson, Orange, N. J.

Application January 16, 1950, Serial No. 138,753

9 Claims. (Cl. 33—203.2)

1

The invention relates generally to wheel alignment testing and correcting equipment and primarily seeks to provide a novel, simple and inexpensively constructed means for signalling to an operator when has has completed the accurate adjustment of the relative positions of the steering wheels of an automobile necessary to provide proper toe-in or comparable positioning of said wheels.

For example, various forms of wheel alignment, testing or gaging devices are available on the market, but no device of which I am aware is capable of determining and signalling either visibly or audibly to an operator when he has made the adjustment which brings the wheels into the desired alignment. No gage on the market sets toe-in, for example, they all check what the existing conditions or relative positions of the steering wheels are, and then if adjustments are made, usually by an operator beneath the front end of the automobile, the gaging devices have to be re-read to determine when the proper adjustment is completed. This usually requires repeated crawling in and out under the automobile and results in wastage of much time and energy. Therefore, it is an object of the present invention to provide novel means controlled by movement of one or both of the steering wheels undergoing relative adjustment for ascertaining the progress of said adjustment as it is being made and signalling to the operator making the adjustment when the desired wheel alignment has been attained, thereby entirely eliminating all necessity for re-reading of gaging devices and the incidental repeated crawling in and out from beneath the automobile.

In its more detailed nature the invention seeks to provide a wheel alignment signalling means of the character stated including two relatively movable elements, means for mounting said elements for movement respectively with the wheels of a pair of steering wheels being aligned, contact members connected in circuit with a power source and a signalling means, means movable with one of said elements for bringing about signalling circuit closing engagement of said contacts after a predetermined amount of relative movement of said elements, and means for initially setting the relative positions of said elements in accordance with the known degree of off alignment of the wheels and thereby determining said predetermined amount of relative movement necessary to bring about proper wheel alignment so that when an operator proceeds to adjust the relative positions of the wheels to

2 properly align them the contacts will be caused to effectively engage and complete the signalling circuit when the wheel adjustment has progressed to completion of the desired wheel alignment.

Another object of the invention is to provide a wheel alignment signalling means of the character stated wherein the relatively movable elements comprise telescoped tube and rod members whereon the contacts are mounted, means being included for attaching each said member to one of the steering wheels being tested and aligned, and the connection of at least one said member with the attaching means being adjustable to vary the relation of the contacts and the contact engaging means in accordance with the known condition of off alignment of the wheels.

Another object of the invention is to provide a wheel alignment signalling means of the character stated wherein the telescoped members have scale means thereon for facilitating the setting of the relative spacing of the contacts and the contact engaging means prior to commencement of the adjustment of the wheel alignment.

With the above and other objects in view that will hereinafter appear, the nature of the invention will be more clearly understood by reference to the following detailed description, the appended claims and the several views illustrated in the accompanying drawing.

In the drawing:

Figure 1 is a plan view illustrating the invention applied for use on the steering wheel of an automobile.

Figure 2 is an enlarged fragmentary vertical longitudinal section taken on the line 2—2 on Figure 1, the connection with the electrical signalling means also being illustrated diagrammatically.

Figure 3 is an enlarged fragmentary vertical longitudinal section taken on the line 3—3 on Figure 1.

Figure 4 is an enlarged fragmentary sectional view illustrating the engagement of one of the mounting bracket arms with a wheel rim.

In the example of embodiment of the invention herein disclosed, the wheel alignment signalling means is shown as particularly adapted for signalling the attainment of proper toe-in, but it is to be understood that the same may be adapted for other wheel alignment signalling purposes.

The steering wheels to be aligned are indicated at 5, and it is to be understood that they are supported on spindles turnable about the usual kingpins 6 on a suitable axle structure 7, being turnable through the medium of the usual turning arms 8 which are adjustably connected at 9 with the usual connector rod 10.

The signalling means includes a rod or tube 11 having a scale 12 thereon which includes a central or zero indicator mark 13. The rod or tube is slidable in a tubular member 14 having a clearance 15 through which the rod scale may be viewed, and terminating in a transerse end extremity 16 which may be utilized as a sighting means in conjunction with the rod scale 12, 13 in the manner clearly illustrated in Figures 1 and 2.

The tubular member 14 is equipped with a chamber or bore 17 which is internally threaded at its outer end as at 18 to adjustably receive an abutment ring 19. A contact ring 20 is fixed in the inner end of the chamber, and it will be apparent by reference to Figure 2 that the center opening at the contact ring is large enough to clear the telescoping rod 11. A conductor 21 is attached to the contact ring 20 at one end and also is connected at its other end with a binding post 22.

A block 23 is freely slidable in the chamber 17 and carries a centrally disposed contact 24 which is mounted axially of the slide block and extends through the inner end thereof in the manner clearly illustrated in Figure 2. The center contact 24 is connected by a flexible lead 25 with a binding post 26, said lead being passed through the center opening in the abutment ring 19. The binding posts 22 and 26 are connected by conductors 27 with a signalling means 28 and a suitable source of power indicated at 29. It is to be understood that the signalling means may take the form of an audible signal such as a bell or it may take the form of a visible signal, such as a light.

The slide block 23 also is equipped with a contact 30 which is secured thereto as at 31 and includes a transversely bent flexible end portion 32 which is of sufficient length to be engageable with the contact ring 20, the center contact 24 and the slidable rod 11. A compression spring 33 interposed between the abutment ring 19 and the slide block 23 within the chamber 17 constantly tends to force the contact portion 32 into engagement with the contact ring 20 in the manner illustrated in Figure 2. It should be understood that by moving the rod 11 to the left as viewed in Figure 2 it can be made to engage the flexible contact portion 32 and displace it to the left so as to bring about engagement thereof with the center contact 24. When this is accomplished without moving the contact extension 32 away from the contact ring 20 the signalling circuit will be completed through the conductors 27, the power source 29 and the signalling means 28 to actuate the signalling means. Should additional force be applied through movement of the rod 11 the slide block 23 would be shifted so as to move the contact extension 32 away from the contact ring 20 and this would break the signalling circuit.

It should be understood that any acceptable means for so mounting the telescoped elements 11 and 14 as to cause them to partake of movement of adjustment imparted to the wheels 5 incidental to adjustment of the toe-in relation thereof may be employed. In this example disclosure, the attaching means comprises a pair of support members 34 each having a fixed bracket 35 at one end and a second bracket 36 adjustably mounted thereon. The brackets 35 and 36 of each supporting member 34 have arm extensions 37 equipped with grip pieces 38 for engaging with a wheel rim in the manner clearly illustrated in Figure 4. The arms 37 of each cooperating pair are equipped with telescoped elements 40 and clamp means 41 by which the arms will be spread and locked against a wheel rim in a manner illustrated in Figure 4 to secure the respective support member 34 on the wheel.

In setting up the apparatus for signalling the attainment of a desired wheel alignment the support members 34 are mounted in the manner illustrated in Figure 1, and the telescoped elements 11 and 14 are suitably mounted on said support members so that movement imparted to the wheels 5 in adjusting the toe-in or alignment thereof will in turn be imparted to said telescoped elements. An acceptable mounting means comprises a collar 42 which may be attached as at 43 to one end of one of the support members 34 and through which the rod 11 may be slidably mounted and secured in proper adjustment by a clamp means 44. In this manner an adjustable attachment of the rod 11 with one of the supporting members 34 is effected. See Figures 1 and 3. The other element 14 is equipped with a band 45 which may be attached as at 46 to the other supporting member in the manner illustrated in Figures 1 and 2.

In the practical operation of the herein described apparatus some suitable toe-in gaging means is employed to test the toe-in setting of the wheels. By this means it is determined exactly how much movement of adjustment in one direction or the other must be imparted to the wheels in order to attain the desired toe-in. Let us assume a condition in which it is determined the toe-in of the wheels must be increased a certain amount. The supporting devices 34 would be mounted in the manner previously described and as shown in Figure 1, and then the clamping device 44 would be loosened and the rod 11 would be slid to the right as viewed in Figures 1, 2 and 3 so as to displace the zero mark 13 of the rod scale a distance to the right of the indicator end extremity 16 of the member 14 equivalent to the amount of movement of adjustment necessary to be imparted to the wheels in order to bring about the desired toe-in condition. With the rod 11 thus set the clamping means 44 would again be tightened. Thereafter the operator would adjust the relative positions of the wheels 5 by manipulation of the tie-rod mountings 9, and it will be obvious that as the movement of adjustment of the wheels takes place the rod 11 will be telescoped in the tubular member 14. Because of the previous setting of the rod in the manner previously described, as the zero mark 13 on the scale comes into position opposite the indicator end extremity of the member 14 the desired toe-in will have been attained, or in other words the necessary adjustment of the wheels will have been completed. At this instant, the inner end extremity of the rod 11 will have come against the flexible end 32 of the contact 30 so as to move the same into circuit completing contact with the inner end extremity of the center contact 24, without disrupting the contact of said extension portion 32 with the contact ring 20. Thus a circuit will be completed through the conductors 27, the power source 29 and the signal 28 and the operator will know that he has completed the necessary adjustment of the toe-in of the wheels.

It will thus be apparent that the whole process of adjustment can be completed without crawling in and out from under the automobile and readjusting or re-reading of the gaging devices. Should the operator improperly condition the adjustment, effecting an increase of toe-in, the continued movement inwardly of the rod 11 would bring about a movement of the slide block 23 which would displace the contact portion 32 from its engagement with the contact ring 20, and this breaking of the circuit and cutting off of the signal 28 would acquaint the operator with the fact that he had passed over the proper adjustment.

Assuming a condition requiring that the amount of toe-in be diminished, the adjustable connection 42, 44 would be utilized to adjust the rod 11 in the opposite direction, or in other words to place the zero mark 13 of the scale to the left of the indicator and extremity 16 of the member 14 a distance equivalent to the amount of adjustment necessary to bring the wheels into the proper toe-in relation. This movement of the rod to the left would displace the slide block 23 so as to break the contact between the ring 20 and the flexible contact extension 32, while holding said extension 32 in contact with the center contact member 24. The operator would then proceed with the adjustment of the wheels as before described, and as the proper toe-in position is reached, bringing the zero scale mark 13 in alignment with the indicator end extremity 16 of the member 14, the rod 11 will have been moved to the right far enough to again permit the contact extension 32 to engage with the contact ring 20 while it is still in engagement with the center contact member 24 and thereby complete the circuit through the signal 28 so as to make known to the operator that he has attained his objective.

It has been explained herein that the means for signalling to the operator when he has completed the accurate adjustment of the steering wheels of an automobile necessary to provide the desired wheel alignment may comprise audible or visible signalling means, and it is to be understood that the visible signalling means may include placement of the signal bar structure and its scale means so that the operator can view said scale means without leaving his position beneath the automobile.

While one form of the invention has been shown for purposes of illustration it is to be clearly understood that various changes in the details of construction and arrangement of parts may be made without departing from the spirit and scope of the invention as defined in the appended claims.

I claim:

1. In apparatus of the character described, two relatively movable elements, means for mounting said elements for movement respectively with the wheels of a pair of steering wheels being aligned, normally spaced contact members connected in circuit with a power source and a signalling means, means movable with one of said elements for bringing about signalling circuit closing engagement of said contact members after a predetermined amount of relative movement of said elements, and means for initially setting the relative positions of said elements in accordance with the known degree of off alignment of the wheels and thereby determining said predetermined amount of relative movement necessary to bring about proper wheel alignment so that when an operator proceeds to adjust the relative positions of the wheels to properly align said wheels the contact members will be caused to effectively engage and complete the signalling circuit when the wheel adjustment has progressed to completion of the desired wheel alignment.

2. Apparatus as defined in claim 1 wherein the relatively movable elements comprise telescoped tube and rod members by which the contact members are supported, means also being included for attaching each of said rod and tube members to one of the steering wheels being tested and aligned and the connection of at least one said rod or tube member with the attaching means being adjustable to vary the relation of the contact members and the means for bringing about engagement thereof in accordance with the known condition of off alignment of the wheels.

3. Apparatus as defined in claim 1 wherein the relatively movable, elements comprise telescoped tube and rod members by which the contact members are supported, said rod and tube members having scale means thereon for facilitating the setting of the relative spacing of the contact members and the means for bringing about engagement of said contact members prior to commencement of the adjustment of the wheel alignment, and means also being included for attaching each said rod or tube member to one of the steering wheels being tested and aligned and the connection of at least one said rod or tube member with the attaching means being adjustable to vary the relation of the contact members and the means for bringing about engagement thereof in accordance with the known condition of off alignment of the wheels.

4. In apparatus of the character described, a signal control bar structure comprising a rod member and a tubular member into which said rod member is slidably telescoped, means for attaching each said member on one wheel of a pair of steering wheels so that the common axis of said telescoped rod and tubular members is disposed generally perpendicular with respect to the planes of rotation of the wheels when said wheels are in their straight forward position whereby as the planes of rotation of the wheels are tilted relatively one to the other incidental to adjustments of wheel alignment said rod and tubular members will be caused to move relatively one to the other along their common axis in one direction or the other, wheel alignment indicating scale markings on said rod and tubular members and means adjustably securing one said rod or tubular member on its wheel attaching means so that it can be initially set to separate the scale markings a distance equivalent to the amount of movement of adjustment known as necessary to be imparted to the wheels in order to establish proper wheel alignment, and a signalling circuit including a signal and normally spaced contacts carried by the control bar structure and means for bringing said contacts into circuit closing engagement when the rod and tubular members carrying the scale markings have moved relatively along their common axis far enough to bring the scale markings in line at the completion of movement of adjustment of the wheels and establishment of the desired proper alignment of said wheels.

5. Apparatus as defined in claim 4 in which the tubular member has a contact chamber into which an end of the rod member may extend, and in which the contact members comprise a contact ring through which said rod end may extend, a block slidable in said chamber and having a contact extending centrally from its end toward said ring and a second contact including a flexible end portion bent transversely across the center of the block so as to be engageable by said rod end and forced thereby against said centrally extending contact and also engageable with said ring, spring means constantly urging the block in a direction for contacting the contact flexible end portion against the ring, and means connecting said ring and said centrally extending contact in the signalling circuit.

6. Apparatus as defined in claim 4 in which the tubular member has a contact chamber into which an end of the rod member may extend, and in which the contact members comprise a contact ring through which said rod end may extend, a block slidable in said chamber and having a contact extending centrally from its end toward said ring and a second contact including a flexible end portion bent transversely across the center of the block so as to be engageable by said rod end and forced thereby against said centrally extending contact and also engageable with said ring, spring means constantly urging the block in a direction for contacting the contact flexible end portion against the ring, and means connecting said ring and said centrally extending contact in the signalling circuit, said rod end being placeable in the initial setting a greater or lesser distance to one side or the other of said ring and effective when spaced to one side of the ring to move against the flexible end portion as the wheel adjustment progresses and press it into circuit closing contact with the centrally extending contact while said flexible end portion remains in circuit closing contact with the ring, and when spaced to the other side of said ring serving to displace the block and hold the flexible end portion in contact with the centrally extending contact and away from the ring and effective when moving incidental to wheel adjustment to hold the flexible end portion against said centrally extending contact as the spring returns the block into position for engaging said flexible end portion with said ring.

7. In apparatus of the character described, a signal control bar structure comprising a rod member and a tubular member into which said rod member is slidably telescoped, means for attaching each said member on one wheel of a pair of steering wheels so that as the planes of rotation of the wheels are tilted relatively one to the other incidental to adjustments of wheel alignment the members will be caused to move relatively one to the other along their common axis in one direction or the other, wheel alignment indicating scale markings on said members, means adjustably securing one said member on its wheel attaching means so that it can be initially set to separate the scale markings a distance equivalent to the amount of movement of adjustment known as necessary to be imparted to the wheels in order to establish proper wheel alignment, and means effective during adjustment of a wheel alignment and when the scale markings are brought into position to indicate that the desired wheel alignment has been attained to signal to an attendant or attendants at points remote from said scale markings and possibly including a position beneath an automobile on which the bar structure is mounted that the desired alignment has been attained.

8. Apparatus as defined in claim 7 wherein the signalling means includes an electrical energizing circuit and contact members carried respectively by the telescoped tubular member and rod and effectively engageable when the scale markings are brought into position for indicating that the desired wheel alignment has been attained.

9. Apparatus as defined in claim 7 wherein the signalling means includes an electrical energizing circuit and contact members carried respectively by the telescoped tubular member and rod and effectively engageable when the scale markings are brought into position for indicating that the desired wheel alignment has been attained, said contact members being disposed to effectively engage and close the circuit only at the wheel alignment indicating position of the adjusted scale markings whereby adjustment beyond the necessary amount will break the signalling circuit and then readjustment back to the desired wheel alignment will again bring about a closing of the signalling circuit.

EDWARD D. WILKERSON.

REFERENCES CITED

The following references are of record in the file of this patent:

UNITED STATES PATENTS

| Number | Name | Date |
|---|---|---|
| 2,003,178 | Duby | May 28, 1935 |
| 2,363,060 | Greenleaf et al. | Nov. 21, 1944 |
| 2,522,066 | Smith | Sept. 12, 1950 |
| 2,552,178 | James | May 8, 1951 |